July 18, 1950     E. S. HENNING     2,515,221
CATHODE-RAY PHASE MEASURING DEVICE
Filed Jan. 22, 1948     3 Sheets-Sheet 1
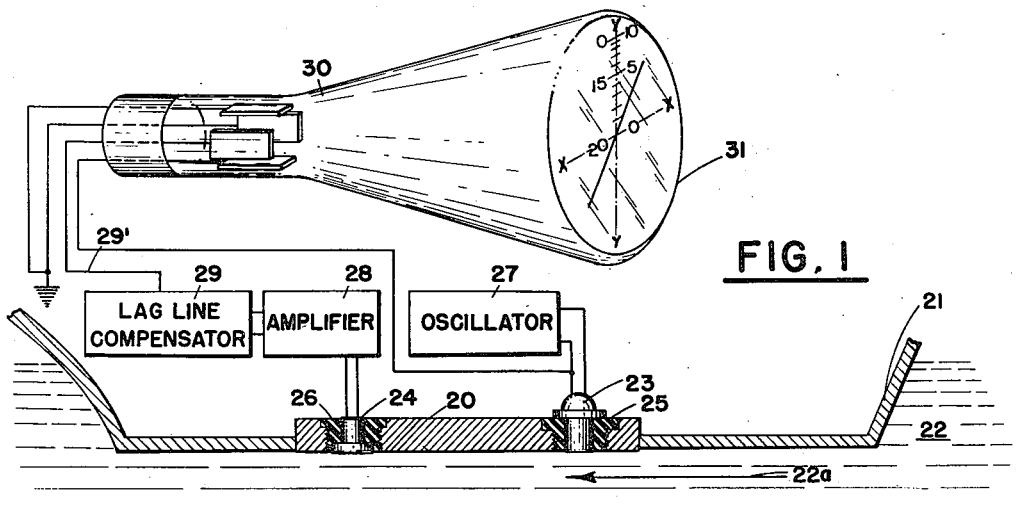
FIG. 1
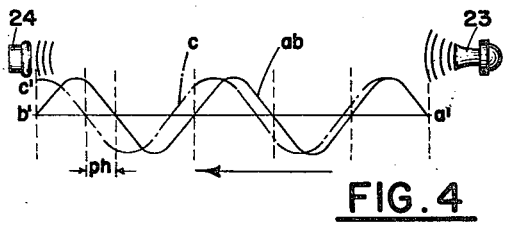
FIG. 4
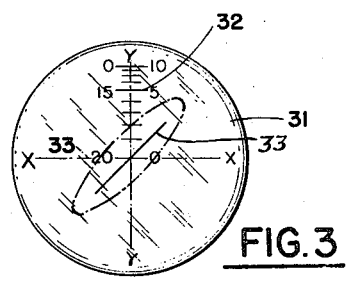
FIG. 3
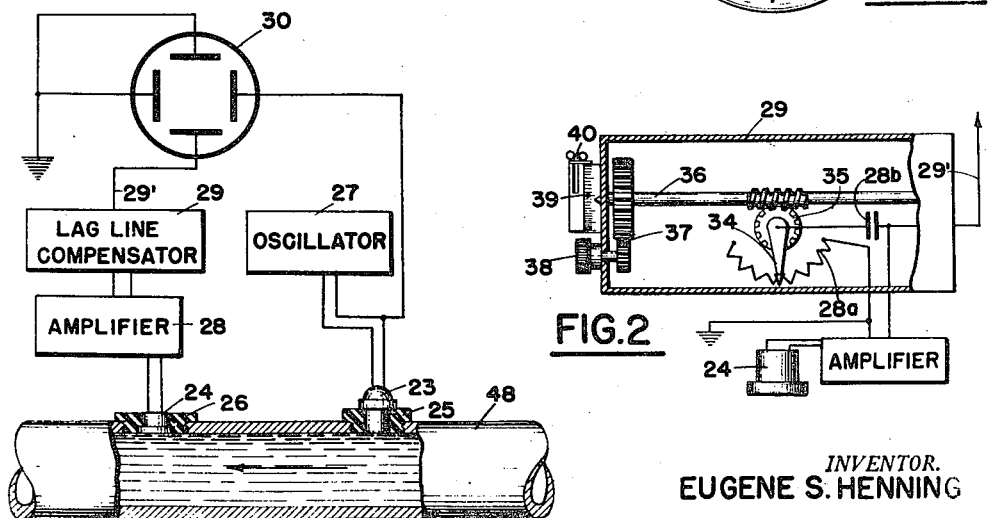
FIG. 2
FIG. 8
INVENTOR.
EUGENE S. HENNING
BY
ATTORNEY July 18, 1950     E. S. HENNING     2,515,221

CATHODE-RAY PHASE MEASURING DEVICE

Filed Jan. 22, 1948     3 Sheets-Sheet 2

INVENTOR.
EUGENE S. HENNING
BY
ATTORNEY

July 18, 1950        E. S. HENNING        2,515,221

CATHODE-RAY PHASE MEASURING DEVICE

Filed Jan. 22, 1948        3 Sheets-Sheet 3

INVENTOR.
EUGENE S. HENNING
BY
ATTORNEY

Patented July 18, 1950

2,515,221

UNITED STATES PATENT OFFICE 2,515,221

CATHODE-RAY PHASE MEASURING DEVICE

Eugene S. Henning, Arlington, Va.

Application January 22, 1948, Serial No. 3,775

1 Claim. (Cl. 177—317)

(Granted under the act of March 3, 1883, as amended April 30, 1928; 370 O. G. 757)

This invention relates to a speed indicator, and more particularly to a mechanism on a body for projecting sound waves into, and for receiving the same from, a medium and including a device for indicating the time interval between the projection and the receipt of the sound waves, the time elapsed being a function of the relative speed between the medium and the body.

Speed indicators developed in the past are varied and depend for their operation upon different principles, such as a differential pressure effect, the cooling effect of a medium, the deflection of a member or the frictional contact with the ground.

An example of an indicator dependent upon the differential pressure effect is the Pitot-static device which measures the difference between the pressure developed by the impact of an air or water stream on the front of a tube (Pitot pressure) and the pressure in a region where stable air or water flow exists (static pressure). As this type of indicator is temperature-sensitive as well as pressure-sensitive, computations must be made to correct the speed indication for the particular temperature and pressure conditions encountered and for this reason continuous readings of true speed cannot be easily obtained. Also the pressure and temperature values needed to correct a speed indication are not always readily available or accurately known, especially for aircraft, and the use of automatic temperature and pressure compensators has not entirely eliminated this defect. Additionally, the readings obtained by this type of indicator varies with the square of the speed of the vehicle involved and therefore at low vehicle speeds the readings are of small magnitudes and hence not very accurate. Similarly, calibration curves are not linear and when used special corrections must be made to insure maximum accuracy. The Pitot-static device may be used to measure the speed of water-borne vehicles and although under these conditions the temperatures and pressures are relatively stable, the readings obtained are not accurate for the reasons given. In other installations, a Venturi tube is combined with the Pitot tube but this presents an added defect for the reason that the Venturi tube is sensitive to small changes in dimensions thereby necessitating great care during manufacture and the prevention of icing during use. Also, at high speeds the compressibility of air affects the calibration.

A device depending upon the cooling effect of a medium is the hot-wire anemometer in which an air stream is made to impinge upon a heated wire, the chief defect of which is its fragile construction. The aging of the wire requires frequent calibration of the instrument. The reading obtained must be compensated for each density at which it is used and no satisfactory means for doing this has been found.

An indicator relying upon the deflection of a member, in common use on early aircraft, usually consisted of a hinged flat plate exposed perpendicularly to the air stream with its motion opposed by a spring, the degree of deflection of the plate being a measure of the air speed. This was inexpensive but inaccurate.

Other instruments relying upon the deflection of a member are the cup and vane anemometers, which employ rotatable cups or vanes. At low speeds the reading of the instrument is independent of air density, if the rotating parts have negligible resisting torque. The cup anemometer is located with the axis of cup rotation perpendicular to the direction of motion of the stream which makes aircraft mounting somewhat difficult and hence is rarely used on aircraft, although it is a standard instrument for meteorologists. Having the same objections to its use is the vane anemometer which is placed with the axis of vane rotation parallel to the direction of motion of the stream. However, it can be used to measure the air speed of blimps, in which case it can be suspended far enough from the bag to eliminate interference effect. As the instrument calibration depends upon the friction of the movable parts and as this friction changes with time, frequent calibration is necessary. In each of these anemometers the speed of rotation of the cups or vanes is proportional to true air speed.

Another form of device employing a deflectable member is the extensible pressure pick-up, sometimes used in small vessels, the movement of which is balanced either by spring pressure, by diaphragm pressure, by bellows pressure or by means of a manometer. The simplest speedometer of this type is an inclined rod extending from the vessel and balanced by a spring. Forward motion of the vessel causes the rod to be forced into a definite position determined by the spring constant.

Instruments driven by impeller-units have also been used in ships but are not entirely suitable for they are often fouled by foreign objects and easily get out of adjustment. Also, at high speeds considerable resistance to forward motion is involved with impeller-units and extensible pressure pick-ups.

Instruments relying upon frictional contact with the ground are exemplified by the automobile speedometer. However, this instrument is limited in its application to ground vehicles.

A speed indicator forming the subject matter of the present invention and employing sound waves at sonic or supersonic frequencies, provides a different approach to the solution of the problem of measuring speed. This type of indicator does not depend upon hydraulic characteristics, such as in the Pitot tube pick-up, or upon dynamic characteristics found in the movable form of pick-up. The sound-wave indicator can operate at high speeds and by a suitable arrangement will function on aircraft operating at supersonic speeds.

The sound-wave indicator is not sensitive to altitude since the velocity of sound waves in a particular medium is affected by pressure only to a minor extent; it can be made continuously-operating, which of course is a great advantage for navigational purposes; it has inherently greater accuracy, particularly at low speeds.

A sound wave transmitted in still air has a velocity that is relative to a starting point in the air itself as well as to a point fixed on the surface of the earth. When the air is moving, the sound waves are carried with it and the velocity of the sound wave is the resultant of its velocity relative to the air itself and the velocity of the air relative to the earth. This can be best illustrated by the common observation that sound carries better with the wind than against it. If the wind is blowing with the sound, the velocity of the wind must be added to that of the sound. Conversely, if the wind is blowing against the sound, its velocity must be subtracted. This explanation is also applicable to sound propagated in liquids or any other elastic medium. The measurement of the time interval between the emission and the reception of a signal is an indication of the velocity of the sound wave through the medium and from which the speed of a body can be determined.

The instant invention contemplates the method and the apparatus for determining this time interval and to utilize it for indicating the relative speed between a body and the elastic medium through or on which it moves. Briefly, this involves a pair of transducers fixed a predetermined distance apart on a moving body, with one functioning as a transmitter for generating sound waves and the other as a receiver for detecting the same, and an indicator for measuring the time consumed by the sound waves in travelling through the medium between the transducers. The elapsed time is a function of the relative speed between the transducer (and therefore the body) and the medium. That is, the frequency of the received signal will be the same as that transmitted but a phase angle change or time lag (as distinguished from a Doppler shift in frequency) is introduced by the medium. This phase angle or time difference between the transmitted and received sound wave, is an indication of speed and may be expressed in either electrical degrees, fractions of a cycle per second or indicated visually on a phase measuring device. From this indication speed is determined.

The present invention can be employed to indicate the airspeed of aircraft, the ground speed of a vehicle, the speed of a ship and the like.

It has further application to the measurement of the flow of fluids, such as wind velocities in obtaining meteorological data, and the velocity or the quantity of a liquid through a pipe or channel.

It is an object of this invention to measure the speed of a body by determining the time interval required for a signal to traverse a path of a definite length relative to the body.

Another object is to determine the velocity, or quantity, of a fluid moving past points of reference by the time interval required for the transmission of a signal propagated through the fluid between the reference points.

It is still another object to employ a pair of transducers fixed relative to each other on a body moving in a medium and a mechanism activated by the transducers for indicating the time interval for a signal to travel through the medium between the transducers, the time interval being a function of the relative speed between the body and medium.

An additional object is to employ a pair of sound receiving devices, spaced relative to each other on a body, and an indicating device for measuring the time interval required for a sound wave, propagated in the medium, to pass both receiving devices.

It is a still further object of the present invention to determine the relative speed between a body, stationary or moving with respect to the earth, and a medium in which, through which, or on which it operates by projecting a signal into the medium and measuring the difference in phase angle, or the time elapsed, between the emission of the signal and its receipt by a transmitting device and receiver, respectively.

It is a still further object to include in the present invention a filtering circuit for screening out undesired or interfering signals.

The aforegoing objects, as well as the exact nature of this invention will be apparent from reference to the following description accompanying the drawings in which:

Figure 1 is a schematic diagram of the basic form of speed indicator forming the present invention;

Figure 2 is a schematic view of the lag line compensator of Figure 1 for adjusting the phase relation of the received signal;

Figure 3 is an elevational view of the indicating portion of the phase indicating device of Figure 1;

Figure 4 is a representation of sound waves transmitted to the receiving device and showing the phase relationship between the transmitted and received portions of the sound wave;

Figure 8 is a schematic diagram of the basic form of the invention as applied to the measurement of the flow of fluids;

Figure 5:
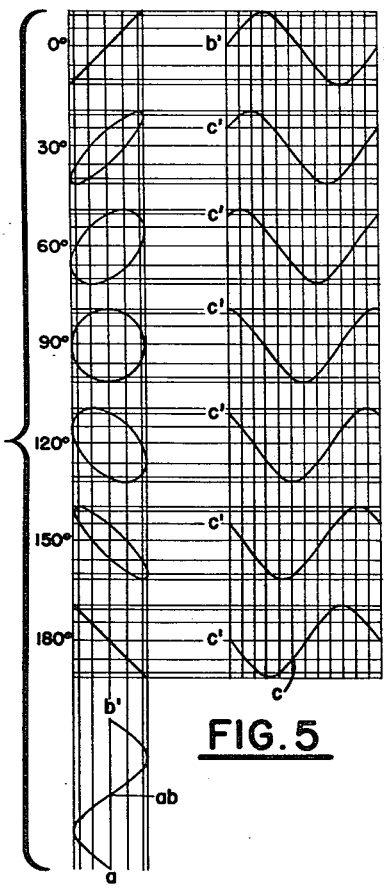
Figure 5 is a series of patterns obtainable on the indicating portion of Figure 3 which correspond to the phase differences between the signal wave as transmitted and as received for different speeds.

Essentially, the speed indicator (Fig. 1) includes a sound head 20 mounted upon a body 21 the speed of which it is desired to determine. This body 21 is intended to represent any moving craft (aeroplane, ship, ground vehicle) or a fixed ground installation, all operative in an elastic medium 22 (water, air).

The sound head 20, which may be of wood, brass or any other desirable material, is suitably mounted on the body 21 and contains transducer units 23 and 24 carried by resilient supports, such as rubber inserts 25 and 26, to eliminate any disturbing effects from being transmitted through the sound head 20 between the units 23 and 24, or to them from any external source.

The transducer 23 may be any of the commercial types of transmitter devices available for converting electrical oscillations, generated by an oscillator 27, into mechanical vibrations forming a signal for projection into the medium 22.

The oscillator 27 may be any of the conventional types, such as a piezo-electric sound generator, a magneto-strictive sound generator, an electromagnetic sound generator or a gas current vibrator generator, capable of generating frequencies in the range of 3,000 c. p. s. to 100,000 c. p. s., although the upper portion of the range may be extended by the use of quartz crystals or other means well known in the electrical art. When the medium 22 was air, a frequency range of 3,000 c. p. s. to 30,000 c. p. s. was found suitable. Lower frequencies may be correspondingly used for lower speed ranges. The higher frequencies, 10,000 c. p. s. to 100,000 c. p. s., were used in water in order that the speed calibration for any given speed range would remain the same for water as for air. The best frequency, however, depends upon the speed capabilities of the particular body or vehicle and the distance between transducers 23 and 24. The manner in which a certain frequency is chosen will be described further, but when once selected it remains unchanged.

The transmitter 23, which may be either directional or non-directional, projects its signal into the adjacent medium for transmission to the other transducer 24, which may be located to either side of the transmitter 23. The signal may be continuous, intermittent or formed by a series of impulses.

The transducer 24 is exposed to the medium 22 and may be either a uni- or non-directional receiver and may be any commercial type microphone or the like, suitable for detecting the signal frequencies employed.

A signal transmitted from the transducer 23 is picked up by the receiver 24 and fed through an amplifier 28, which may be either of the tuned or untuned type, for conversion into a suitable voltage for application through a lag line compensator 29 (Fig. 2) and its conduit 29' to a phase measuring device 30, of which any of the several types now on the commercial market may be used. Of these types, the cathode-ray oscilloscope is the simplest and is depicted in Figure 1 with the usual fluorescent screen 31. The voltage from the amplifier 28 appears on the horizontal deflecting plates of the oscilloscope. The lag line compensator 29 varies the phase angle of the received signal prior to its application to these plates in a manner and for a purpose to be explained.

The output of the oscillator 27 is fed simultaneously to the vertical deflecting plates of the oscilloscope 30 and to the transmitter 23. As a result, any phase difference between the signal wave emitted by the transmitter 23 and as detected by the receiver 24 will appear on the oscilloscope screen 31 as one of the well known Lissajous figures associated with phase difference and, as shown in Figure 5, will vary from a 45-degree right linear trace to 45-degree left linear trace, as the phase relationship vary from 0 degrees to 180 degrees; these figures are utilized in a manner to appear. The frequency of the signal selected is such that the right and left linear traces will correspond to zero and full speed, respectively, between the body 21 and the medium 22. For other frequency settings, adjustment can be made to suit.

The various speed indications are obtained by using measured speed runs of the moving body 21 at various speeds for the purpose of calibrating the oscilloscope screen 31 which may be indexed as shown in Figure 3. The screen 31 is provided with axes or horizontal and vertical coordinates $x$—$x$ and $y$—$y$ at right angles to each other and with indicia marks 32 on the $y$—$y$ axis portion above the $x$ axis. The intersection of the axes is taken as the zero and the maximum relative speed between the body 21 and the medium 22, with the indicia marks on the right of the $y$—$y$ axis numbered in ascending order and those on the left of the same axis in descending order.

The pattern on the oscilloscope screen, as shown in Figure 5, will vary from a linear or a "thin" elliptical trace to a circular trace. The "width" or "thickness" of the figure along the $y$—$y$ axis is utilized and by association with the indicia marks 32 (Fig. 3) a speed indication is obtained.

As previously explained, the operation of the instant invention depends upon the principle that there is a difference in the relative velocity with which a signal wave will travel in a moving medium as compared to that in a still medium. To visualize this operation, reference is now made to Figure 4. The electrical energy of the oscillator 27 is converted into mechanical energy at the transmitter 23 which projects a signal into the medium. The velocity with which the signal travels in the medium will depend only upon the medium itself. The relative velocity however, depends also on the direction and velocity of motion with reference to the transducer 24 actuated by the signal, as already explained with reference to air motion. The curve $ab$ represents the wave of a signal emitted from the transmitter 23 in the fluid medium 22 which for the present is assumed to be stationary relative to the body 21 holding the instruments. Any portion of the signal wave impinging upon the microphone 24 will occupy a fixed phase relationship with respect to any portion of the sound wave emanating from the transmitter.

Thus, any portion of the wave, such as for example, particle $a'$, will move from the transmitter 23 through the medium 22 to the microphone 24 and appear thereat as particle $b'$, vibrating with the same frequency but with a phase difference between particles $a'$ and $b'$ that is constant and unchanged. The lag line compensator 29, however, is adjusted by varying the value of resistor 28a in a manner to appear to reduce this phase difference to zero in order that the voltages from the oscillator 27 and the amplifier 28 will appear at their respective oscilloscope plates in phase and thereby obtain the 45-degree right linear trace (Figure 5) on the oscilloscope screen 31 to indicate zero relative speed between the body 21 and the medium 22. Therefore, with zero relative speed, particles $a'$ and $b'$ are made to appear in phase, as shown in Figure 4, and these particles when separated from the transmitter 23, become air or water borne as the case may be, and will have a velocity much less than that in the electrical circuits. This is determined by the general equation for wave motion $$C = \lambda f \quad (1)$$

where
$C$ = velocity of wave propagation in the medium being considered,
$\lambda$ = wave length, and
$f$ = frequency of signal.

The time required for the signal particle $a'$ to travel to the position of particle $b'$, the distance between the transducers 23 and 24, is determined by the expression $$t = \frac{d}{C} \quad (2)$$

where
$d$ = distance in medium between transmitter and microphone,
$t$ = time for signal to traverse the medium a distance $d$, and
$C$ = velocity of signal in the medium.

With the microphone 24 preceded by the transmitter 23, as shown in Figure 1, and upon movement of the fluid medium 22 in the direction of the arrow 22a relative to the body 21, the frequency of the signal remains unchanged but the relative velocity of the signal will change for reasons already explained. This in turn alters the time of travel of the signal and the total velocity of the signal wave $ab$ in the medium now becomes equal to $$C + V \quad (3)$$

where
$V$ = relative velocity between transmitter 23 and the medium 22.

The Equation 1 now becomes $$C + V = \lambda f \quad (4)$$

It follows, therefore, that as $f$ remains constant, the $\lambda$ must change to satisfy the equation. In this particular example chosen for explanatory purposes, the $\lambda$ must increase and the signal is now represented by the dotted curve $c'$ of Figure 2 of longer wavelength.

Thus, particle $a'$ will now vibrate with the same frequency as before but will travel at a greater velocity (hence a longer wave length) and arrive at the microphone not at a position in its path corresponding to $b'$ but at an earlier position, such as $c'$. That is, the particle $c'$ will be out of phase with its zero speed position $b'$. This phase (or time) relationship between particles $b'$ and $c'$, as well as $a'$ and $c'$, (since $b'$ was moved by the lag line compensator 29 into phase with $a'$) may be expressed in terms of the phase angle difference as follows $$ph = 2\pi f t \quad (5)$$

where $ph$ is equal to the phase angle difference between the phase angle ($ph_0$) of the signal wave at the transmitter 23 and at the receiver 24 ($ph_{max}$), which in turn is a function of $t$.

This phase difference ($ph_{max} - ph_0$) between the signal waves $ab$ and $c$ is a function of the relative speed between the body 21 and the medium 22. Thus, with relative motion between the body 21 and the medium 22, the signal represented by wave $c$ is now received by the receiver and reconverted into a voltage for application to the horizontal deflecting plates of the oscilloscope 30. With the transmitter 23 preceding the receiver 24 in the direction of motion of the body 21 (Fig. 1), the time relationship expressed by Equation 2 now becomes for the signal of curve $c$ $$t = \frac{d}{C + V} \quad (6)$$

Transposing:

$$V = \frac{d}{t} - C \quad (7)$$

Substituting the value for $t$ from (5) into Equation 7

$$V = \frac{2\pi f d}{ph} - C \quad (8)$$

Thus, as both the source of transmission and the receiver thereof are at rest or moving at the same velocity with respect to each other, the frequency at the receiver (unlike the Doppler's principle) is unaltered but a phase shift due to the relative velocity of the medium carrying the signal wave occurs as an inverse function of the relative speed $V$.

The values of $t$ and $ph$ of Equations 7 and 8, respectively, may be measured by any of the various devices known to the art, and the mathematical values substituted in Equation 7 or in Equation 8, respectively, in order to derive the true instantaneous value of relative speed $V$. However, it is usually more advantageous to provide a visual indication of relative speed $V$, such as on the screen 31 of oscilloscope 30, of Figure 1. In this arrangement a voltage at the phase angle of particle $a'$ is fed by the oscillator 27 to the vertical deflecting plates of scope 30 while a voltage at the phase angle of particle $c'$ is fed through the lag line compensator 29 and its conduit 29' and amplifier 28 to the horizontal deflecting plates of 30. The voltage from the amplifier 28 and oscillator 27 are made equal, as is well known in the art, and hence the position of the spot on the oscilloscope screen 31 at any given instant, say for points $a'$ and $c'$, is the resultant of the voltages at that instant and the spot will be made to trace a pattern, ranging from a 45° right or left linear trace to an ellipse or circle, as shown in Figure 5 wherein the effect of different phase angles between particle $c'$ and particle $b'$ (which can be considered the same as particle $a'$ due to the adjustment by the lag line compensator 29) result in the patterns illustrated. The vertical "spread" of these patterns is measured along the $y$—$y$ axis (Fig. 3) by the numerals 32 as already explained. A 45° line 33 is included on the screen merely to assist the operator in adjusting the lag line compensator 29 to secure equal phase angles between particles $a'$ and $b'$ for zero relative speed. However, this line 33 may be omitted if desired without affecting the operation of the apparatus.

The lag line compensator 29 not only is used to place the particles $a'$ and $b'$ in phase for the purpose described but is also used to correct for a shift in the phase which might otherwise occur in the equipment between the microphone 24 and the oscilloscope plates. This corrector may be installed in the location depicted in Figure 1 or may be alternatively positioned between the microphone and the amplifier. The lag line compensator 29 is a conventional network containing a phase-shifting circuit, schematically shown in Figure 2, and basically includes a variable resistor 28a and a reactance 28b (either a condenser or an inductance). The shift in phase between the voltage input to the corrector and the output therefrom will depend upon the ratio between the resistance and the reactance in the circuit. The variable resistor 28a is adjusted by an arm 34 turned by worm gearing 35 driven by a shaft 36 which in turn is rotated through spur gearing 37 by knob 38. Attached to the shaft 36 is a pointer 39 movable over a scale 40, which is adjustably mounted for a purpose to appear.

The lag line compensator 29 in addition to its use for compensating for phase shift to "zero in" the apparatus may be also employed to obtain a visual reading. When so used, the lag line compensator 29 is first adjusted for zero relative speed by rotating knob 38 until the phase angle of particle $a'$ coincides with that of particle $b'$ whereby the resultant voltages corresponding to $a'$ and to $b'$ will form the 45° right linear trace of Figure 5. The scale 40 is then adjusted to place the zero index mark opposite the pointer 39.

Upon relative motion between the body 21 and the medium 22, patterns similar to those of Figure 5 will appear on the screen 31. By rotating the knob 38, the patterns may be returned to the linear trace and the distance traversed by the pointer 39 over the scale 40 from the zero index position, while maintaining the linear trace, will be a function of such relative motion.

By observing the position of the pointer 39 reached in moving knob 38 to maintain the 45° right linear trace, speed can be read off the dial 40.

Figure 6:
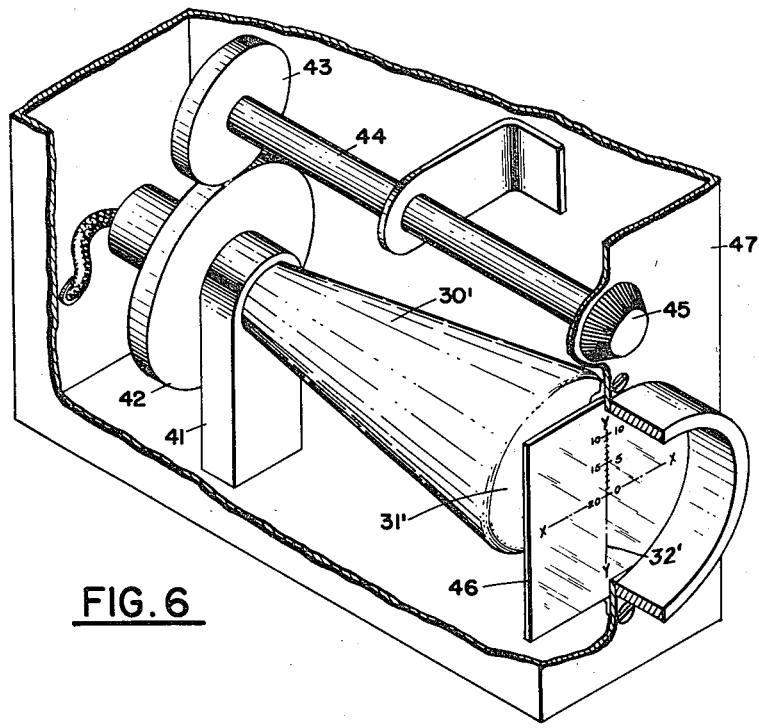
Figure 6 illustrates an alternative form of a phase indicating device.
Figure 7:
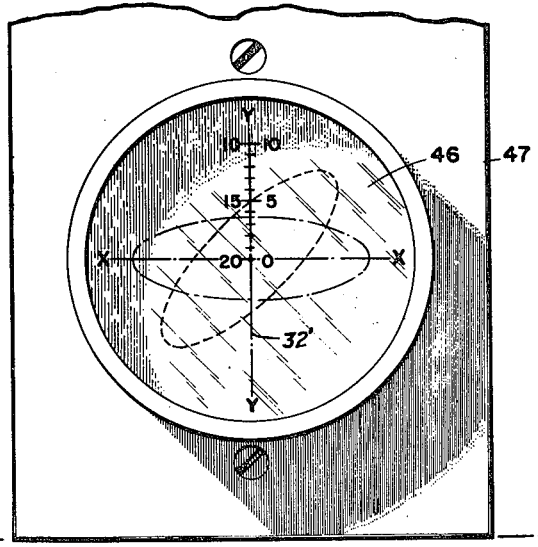
Figure 7 is an elevational view of the indicating screen of the device of Figure 6.

An alternative form of calibrating the hereindescribed electronic apparatus is shown in Figures 6 and 7. The oscilloscope 30', instead of being fixed as 30 in Figure 1, is now rotatably mounted in a bearing 41 and rotated through suitable means, such as members 42 and 43, the latter in turn being driven by a shaft 44 terminating in a control knob 45. In lieu of including the calibration indicia directly on the oscilloscope (Fig. 3), the indicia are placed on a transparent member 46 fixed to the casing 47 housing the oscilloscope 30'. The transparent plate 46, as shown in Figure 7, is calibrated for various speeds similar in manner for those obtained for the markings of Figure 3. During operation patterns will appear on the oscilloscope screen 31' identical to those formed on screen 31 of Figure 3 in a manner already explained. Upon the appearance of a pattern, the oscilloscope 30' is bodily rotated in either a clockwise or counterclockwise direction to bring the major axis of the pattern in coincidence with the $x$—$x$ axis on member 46. The height of the minor axis above the $x$—$x$ axis is compared with the index markings 32' on the $y$—$y$ axis for speed indications. This method of calibration results in a much more uniform scale. The apparatus so far described may also be employed to measure the velocity, or quantity of liquids through a channel, such as the member 48 of Figure 8.

A desired signal frequency, which is dependent upon the speed capabilities of the body or vehicle under consideration and the distance between the transducers 23 and 24, may be selected in the manner to be now explained. For example, assume a single transmitter 23 spaced a distance $d$ of one foot from a single receiver 24 on the body 21 (a ship, for example) planned to operate at a maximum relative velocity of 60 M. P. H. (88 ft./sec.) in salt water (C=4830 ft./sec.). From Equation 8 by substituting these assumed values there is obtained for zero relative speed $$0 = \frac{2\pi f 1}{ph_0} - 4830 \quad \text{or} \quad ph_0 = \frac{2\pi f 1}{4830} \quad (8a)$$

for maximum relative speed $$88 = \frac{2\pi f 1}{ph_{max}} - 4830 \quad \text{or} \quad ph_{max} = \frac{2\pi f 1}{4830 + 88} \quad (8b)$$

For calibration purposes it is desirable that for maximum speed the difference between the phase angle ($ph_0$) of the projected signal and the phase angle ($ph_{max}$) of the received signal be 180° (or $\pi$) in order that the pattern on the oscilloscope will vary from a right linear trace (minimum speed) to a left linear trace (maximum speed) as shown in Figure 5, that is, the phase angle difference ($ph = ph_{max} - ph_0$) of Equation 8 is made to equal 180° or $\pi$. Solving Equations 8a and 8b simultaneously for $f$ (and by substituting $\pi$ for $ph_{max} - ph_0$), $$f = 135,000 \text{ c. p. s. (135 kc.)}$$

Thus, it can be seen that with a selected signal frequency of 135,000 c. p. s., the oscilloscope will indicate $ph$ ($ph_{max} - ph_0$) and by comparing the trace on its screen 31 with the indicia 32 thereon, as already mentioned, relative speed is found.

It must be borne in mind that the oscilloscope measures the difference in phase between the projected and the received signal, rather than the absolute phase angles of each. In other words, at 135 kc., wavelength is 0.0358 feet; for the distance ($d$) of one foot between the transducers 23 and 24, 28 complete waves are present.

Thus, the absolute value of $ph_0$ at the microphone 24 for zero speed is (28 times $2\pi$) $56\pi$. As it is desired to maintain, as already explained, a 180° (or $\pi$) difference between zero and maximum speed, the absolute value of $ph_{max}$ at the microphone for full speed (60 M. P. H.) will be ($56\pi - \pi$) $55\pi$. However, the oscilloscope can only recognize the difference ($ph_{max} - ph_0$) which will vary from 0 to 180. This may be checked by substituting all the known values in Equation 8 as follows $$V = \frac{2.\pi.135000.1}{55\pi} - 4830$$

$$= 88 \text{ ft. per sec.}$$

It should be also clear that the lag line compensator 29 when utilized to adjust for zero speed does not correct for the $56\pi$ phase, but only to the extent necessary to arrive at the right linear trace of Figure 5 for zero indication at zero speed.

Although the phase difference ($ph_{max} - ph_0$) between maximum and zero relative speeds was selected in the aforegoing explanation as 180° (or $\pi$), it is advisable to use a phase difference less than 180° (or $\pi$), such that the angular difference between the phase angle ($ph_0$) at zero relative speed and the phase angle at any other particular speed (between zero and maximum) will have its numerical value approximately proportional to its natural sine. Thus, such phase difference, instead of being 180°, may be selected to be $$\frac{3}{8}\pi$$

in degrees.

Although the apparatus thus far described employs a single transmitter 23 cooperating with a single receiver 24, a number of either of these transducers may be employed and positioned on opposite sides or on each side of the other transducer.

Figure 9:
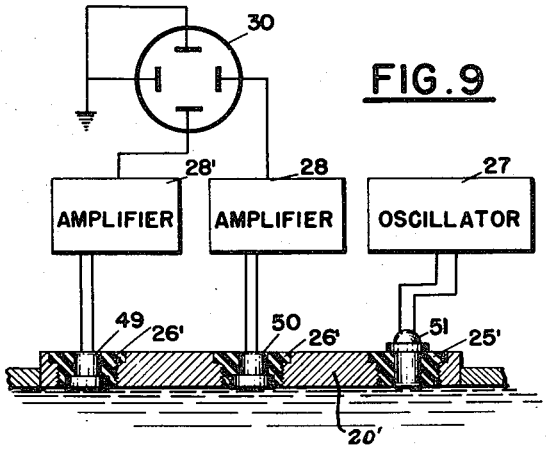
Figure 9 is a block diagram of a modification of the invention wherein two receivers on the same side of the signal generator are utilized.

Thus, in the modification of Figure 9, two receivers 49 and 50 are employed, both on the same side of the transmitter 51, all mounted in a sound head 20'. The aforegoing Equations 7 and 8 are still applicable except that for this arrangement $d=$ distance between the receivers,
$t=$ time for the sound wave to travel the distance
$ph=$ the difference in the phase angles of the sound wave at these receivers.

The transducers 49, 50 and 51 are mounted in the resilient bushings 25' and 26' which function the same as the bushings 25 and 26 in Figure 1.

Figure 10:
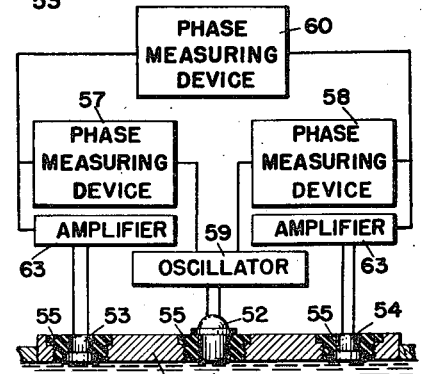
Figure 10 is a block diagram of another form of the invention wherein two receivers are symmetrically positioned about a single transmitter.

In the modification of Figure 10 the transmitter 52 is symmetrically positioned between the receivers 53 and 54, all mounted in rubber supports 55 on sound head 56. A phase measuring device 57 measures the time interval or the phase angle difference between the transmitter 52 and one receiver 53, and a second phase measuring device 58 similarly measures the time lag or phase angle difference between the transmitter 52 and the receiver 54. As in the previous modifications, an oscillator 59 simultaneously actuates the transmitter 52 and the measuring devices 57 and 58, each of which may be the same as the oscilloscope 30. In Figure 10, as in Figures 1, 4 and 8, the arrow indicates the relative motion of the medium.

The time of transmission ($t_1$) of the sound wave from transmitter 52 to receiver 53 is expressed by the equation $$t_1 = \frac{d_1}{C+V} \quad (9)$$

and the transmission time ($t_2$) from transmitter 52 to receiver 54 by the expression $$t_2 = \frac{d_2}{C-V} \quad (10)$$

where
$d_1=$ distance between transducers 52 and 53
$d_2=$ distance between transducers 52 and 54, and
$C$ and $V$ denote the same quantities as in Equation 6.

Let the phase angle difference $ph$ of the signal wave between transmitter 52 and receiver 53 be represented by $ph_1$ (as in Equation 5) and by $ph_2$ between 52 and the receiver 54, and by algebraic transformation Equation 9 becomes $$V = \frac{2\pi f d_1}{ph_1} - C \quad (11)$$

and Equation 10 becomes $$V = C - \frac{2\pi f d_2}{ph_2} \quad (12)$$

Adding (11) and (12), there is obtained $$2V = \frac{2\pi f d_1}{ph_1} - \frac{2\pi f d_2}{ph_2} \quad (13)$$

which simplifies into $$V = f\pi \left(\frac{d_1}{ph_1} - \frac{d_2}{ph_2}\right) \quad (14)$$

Since $d_1=d_2$ in this particular embodiment $$V = fd \left(\frac{1}{ph_1} - \frac{1}{ph_2}\right) \quad (15)$$

Thus V is a function of the difference in phase angles and by taking the difference in the readings observed on the phase measuring devices 57 and 58, as already explained with reference to the embodiment of Figure 1, there is obtained the relative velocity of the body 21.

The difference in phase angles may be electrically obtained by a single phase measuring device 60 by feeding into it the output from both the receivers 53 and 54, the resultant of such outputs thus being indicated on the device 60 and utilized as a speed indication. The difference ($ph_2-ph_1$) is measured directly as a single quantity, in lieu of two separate quantities. As Equation 15 can be written as $$V = \pi fd \left(\frac{ph_2-ph_1}{ph_2 ph_1}\right) \quad (16)$$

and by substituting in the denominator the values of $ph_2$ and $ph_1$ from Equations 11 and 12, there is obtained the following $$V = \frac{\pi fd}{4\pi^2 f^2 d^2}(C^2-V^2)(ph_2-ph_1)$$

which simplifies into:

$$V = \frac{C^2}{4\pi fd}(ph_2-ph_1)(1-V^2/C^2) \quad (17)$$

Thus it can be seen that V (relative speed) is proportional to the phase difference when the ratio V/C is small. This method, however, introduces errors due to C (which is dependent upon temperature, pressure, density) and frequency $f$, but it eliminates the need for a computing device to combine the reciprocals of the phase differences as in Equation 15, to obtain relative velocity. It will be observed in this case that the solution for V becomes indeterminate when V approaches C, that is, when the velocity of the moving body approaches the velocity of the sound waves in the medium involved. This symmetrical arrangement of two receivers eliminates C in Equation 15, and thereby makes the results independent of temperature.

If the values for $t_1$ and $t_2$ of Equations 9 and 10 are substituted for its equivalents in Equation 15 there is obtained $$V = \frac{d}{2}\left(\frac{1}{t_1} - \frac{1}{t_2}\right) \quad (18)$$

Thus, it will be noticed that expression (18) is independent of frequency error as the time intervals are employed. A frequency factor is present, however, in expression (15).

The advantage of a non-symmetrical arrangement with two receivers is that non-linear variation of the velocity of sound wave near its source is eliminated when both receivers are located on the same side of transmitter, as in Figure 9.

In the case of Equation 18 it will be seen that since $d$ is fixed, only the time intervals from the transmitter to the respective receivers will be necessary in order to obtain the velocity V. In the case of expression (15) the phase shift for each receiver is measured, and since the frequency and the distance are both constant the velocity can again be determined readily.

The phase measuring device 60 measures the time interval or the phase difference between both receivers 53 and 54. Thus, let $$t = t_2 - t_1 \quad (19)$$

with the values of $t_1$ and $t_2$ the same as in Equations 9 and 10. Substituting the values of $t$, $t_1$ and $t_2$ into Equation 18, the following expression is obtained by algebraic transformation:

$$V = \frac{t}{2D}(C^2 - V^2) = \frac{C^2 t}{2D} \text{ when } \frac{V}{C} \text{ is small} \quad (20)$$

In terms of phase angle this becomes:

$$V = \frac{ph}{4\pi FD}(C^2 - V^2) = \frac{phC^2}{4\pi FD} \text{ when } \frac{V}{C} \text{ is small} \quad (21)$$

Whereas Figure 10 shows an arrangement using two receivers symmetrically positioned with respect to the transmitter, it may sometimes be found desirable to use two receivers arranged in a non-symmetrical form. When two receivers are positioned on the same side of the transmitter, as shown in Figure 9, the non-linear variation of the velocity of sound near the source is eliminated. It will be apparent that there are numerous variations of one, two, or more receiver systems that measure time delay or phase difference to each receiver or the time delay and the phase difference between two or more receivers. The optimum frequency of the oscillator employed depends upon the medium and on the velocity involved, the higher frequencies being utilized for mediums having a high velocity of sound, such as water, and the lower frequencies for mediums having a lower velocity of sound, such as air.

Figure 11:
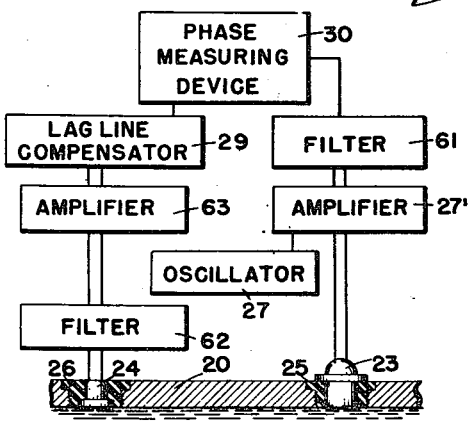
Figure 11 shows in schematic form the modification shown in Figure 1 but with certain refinements added.

The apparatus depicted by Figure 11 is similar to that of Figure 1 but with certain refinements added. The signal from the oscillator 27 is passed to and built-up in an amplifier 27' before reaching the transmitter 23. At the same time, the signal is fed from the amplifier 27' through a filter 62 to an amplifier 63 and thence through lag line compensator 29 and into the phase measuring device 30.

The filters 61 and 62 may be high-pass or low-pass or a combination of both, and their object is to filter a definite frequency to the phase or time measuring device 30.

Figure 12:
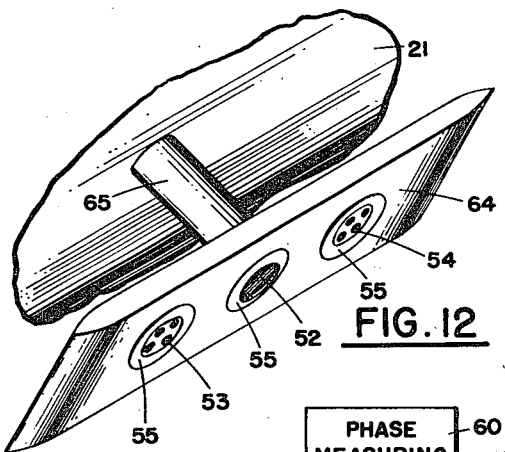
Figure 12 is a perspective view of one form of a sound head in which are mounted the signal generating and receiving devices.

As diagrammatically indicated the transmitters and the receivers are in a sound head 20, 20', 56 which may be installed flush with any external surface of the body 21 to cut down the fluid resistance, and when such is relatively unimportant the sound head may project away from such surface, the manner of mounting having no effect upon the efficiency of the device. A projecting sound head is shown in Figure 12 wherein the head 64 is supported by a stem 65 from the body 21. In this particular sound head 64 is supported the transducer arrangement of Figure 10. However, it is obvious that the sound head 64 may also contain the transducers of Figures 1, 8, 9 and 11. Also, in lieu of mounting the transducers on a sound head, they may be fixed along the body 21 without affecting the operation of the device, although the greater the distance between the transmitter and the receiver, the greater will be the degree of accuracy.

The invention described herein may be manufactured and used by or for the Government of the United States of America for governmental purposes without the payment of any royalties thereon or therefor.

The invention claimed is:

A uniformly accurate phase measuring device comprising in combination; an oscilloscope arranged to trace a pattern in response to the deflection of an electron beam; an enclosed housing; bearing means mounting said oscilloscope therein for rotation about its beam axis; rotating means for turning said oscilloscope about said beam axis; a transparent plate fixed in the viewing end of said housing; control means for said rotating means positioned on the outer surface of said housing adjacent said plate; vertical and horizontal calibration indicia coordinates positioned on the outer surface of said plate so that the vertical and horizontal axes of said pattern may be concurrently viewed through and brought into registration with said coordinates by the rotation of said oscilloscope, whereby the extent of both axes of said pattern may be indicated by said coordinates.

EUGENE S. HENNING.

REFERENCES CITED

The following references are of record in the file of this patent:

UNITED STATES PATENTS

| Number | Name | Date |
|---|---|---|
| 1,768,262 | Marrison | June 24, 1930 |
| 2,015,933 | Hartig | Oct. 1, 1935 |
| 2,193,079 | Schrader | Mar. 12, 1940 |
| 2,251,984 | Cleaver et al. | Aug. 12, 1941 |
| 2,274,262 | Wolff | Feb. 24, 1942 |
| 2,328,546 | Cafarelli | Sept. 7, 1943 |
| 2,446,674 | Sproul | Aug. 10, 1948 |
| 2,465,354 | Clark | Mar. 29, 1949 |